United States Patent [19]
Shikata

[11] Patent Number: 4,743,144
[45] Date of Patent: May 10, 1988

[54] FACE MILLING CUTTING TOOL
[75] Inventor: Hiroshi Shikata, Yokohama, Japan
[73] Assignee: Kabushiki Kaisha Toshiba, Kawasaki, Japan
[21] Appl. No.: 917,904
[22] Filed: Oct. 10, 1986
[30] Foreign Application Priority Data
  Oct. 11, 1985 [JP] Japan .................. 60-226200
[51] Int. Cl.⁴ ............................. B23C 5/20
[52] U.S. Cl. .......................... 407/42; 407/48; 407/62; 407/113
[58] Field of Search .......... 407/42, 46, 48, 62, 407/104, 113

[56] References Cited
U.S. PATENT DOCUMENTS

| | | | |
|---|---|---|---|
| 3,662,444 | 5/1972 | Erkfritz | 407/113 |
| 3,670,380 | 6/1972 | Moore et al. | 407/42 |
| 3,762,005 | 10/1973 | Erkfritz | 29/95 R |
| 3,818,562 | 6/1974 | Lacey | 407/113 |
| 4,175,896 | 11/1979 | Kishinami et al. | 408/230 |
| 4,470,731 | 9/1984 | Erkfritz | 407/46 |
| 4,586,855 | 5/1986 | Rawle | 407/58 |
| 4,597,695 | 7/1986 | Johnson | 407/42 |
| 4,636,117 | 1/1987 | Shikata | 407/104 |

FOREIGN PATENT DOCUMENTS

| | | |
|---|---|---|
| 0069316 | 1/1983 | European Pat. Off. . |
| 2234854 | 2/1973 | Fed. Rep. of Germany . |
| 2628624 | 12/1977 | Fed. Rep. of Germany . |
| 2950698 | 7/1980 | Fed. Rep. of Germany . |
| 52-35160 | 9/1977 | Japan . |

Primary Examiner—Nicholas P. Godici
Assistant Examiner—Richard K. Seidel
Attorney, Agent, or Firm—Foley & Lardner, Schwartz, Jeffery, Schwaab, Mack, Blumenthal & Evans

[57] ABSTRACT

A face milling cutting tool comprises a cutter body and cutting bits or tips mounted thereon and is characterized in that each cutting tip: is of flat shape with at least one cutting edge of convexly curved contour and has at one part of its peripheral surface a rake surface; is so tangentially mounted that a front clearance face thereof leaves an axial relief angle relative to the surface of workpiece being machined; and is so mounted that the radial rake angle of the curved cutting edge is of a large negative value. The contour shape of a cutting tip may be substantially triangular, rectangular, parallelogrammatic, circular, elliptical, or any other suitable closed figure, or a combination of any of such contour shapes.

8 Claims, 6 Drawing Sheets

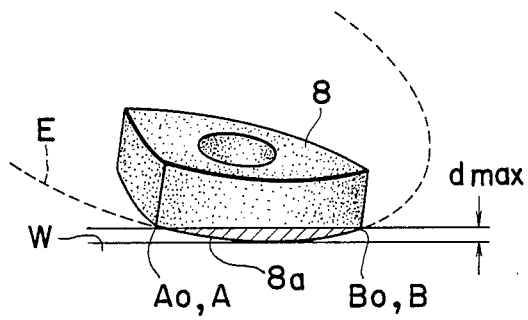
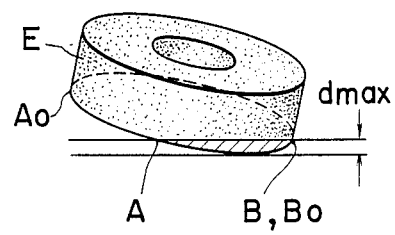
FIG. 8  FIG. 9
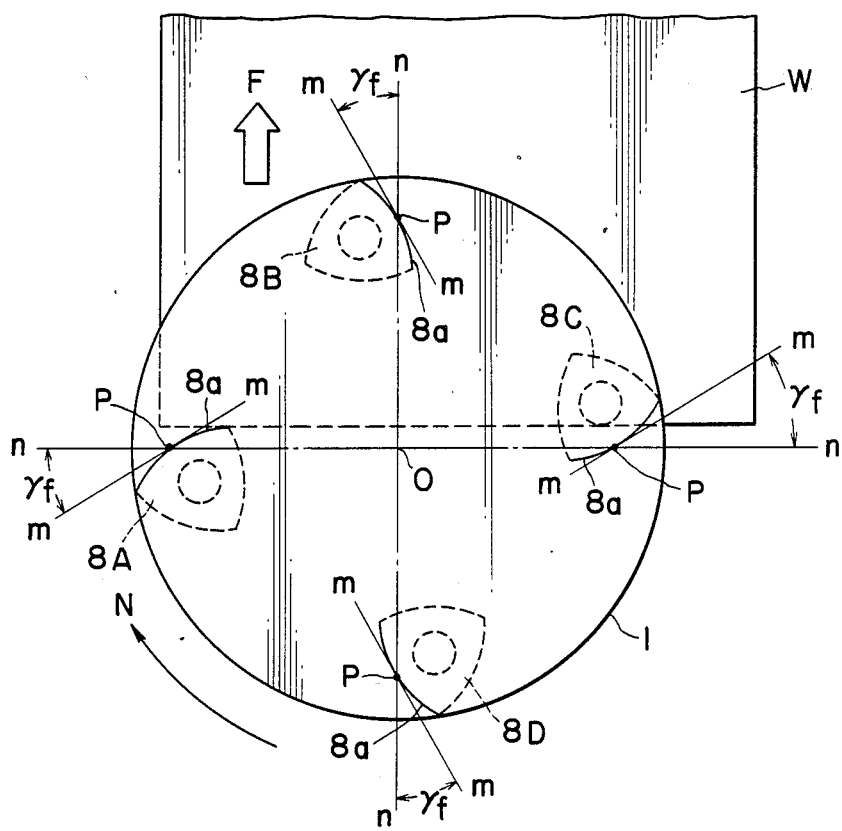
FIG. 10

| EXAMPLE | WORKPIECE MATERIAL | MACHINING CONDITIONS | | | | FINISHED SURFACE ROUGHNESS CURVE | MAX. ROUGH-NESS ($\mu m$) |
|---|---|---|---|---|---|---|---|
| | | CUTTING SPEED (m/min) | FEED (mm/min) | DEPTH OF CUT (mm) | CUTTING LIQUID | | |
| (a) | J.I.S DESIGNATION SS41 (ROLLED STEEL FOR GENERAL STRUCTURES TENS. STRENGTH 41 TO 52 Kgf/mm$^2$) | 143 | 300 | 0.02 | (DRY) | $\updownarrow 10\mu m$ | 1.0 |
| (b) | BABBITT METAL | 578 | 10,000 | 0.03 | (DRY) | $\updownarrow 1\mu m$ | 2.0 |

FIG. 12

ROUGHNESS OF SURFACES FINISHED BY FACE MILLING CUTTING TOOL OF THIS INVENTION

FACE MILLING CUTTING TOOL

BACKGROUND OF THE INVENTION

This invention relates generally to face milling cutting tools and more particularly to a face milling cutting tool (hereinafter "cutter") comprising a cutter body and flat cutting bits or tips, each having around its periphery convexly curved cutting edges and so mounted on the cutter body that a specific axial relief angle is present between a front clearance face of each cutting tip and the face of a workpiece being machined while, simultaneously the radial rake angle of the cutting tip has a large negative value.

In general, a face milling cutter is used as a machining tool for machining a planar surface perpendicular to the rotating spindle axis of a machine. A cutter of this type has a cutter holder or body and a plurality of cutting bits or tips embedded in the cutter body. In one example of this type of face milling cutter, as disclosed in Japan Patent Publn. No. 35160/1977, a plurality of square tips are fixed by clamp screws to the working face of a cutter body. In the face milling cutter disclosed in this publication, the discharging of removed chips toward the periphery is facilitated by providing a radial rake angle of large negative value for each cutting tip.

However, since each cutting edge is linear and the rake face is also planar, the entire length of the linear cutting edge engages and disengages simultaneously with the workpiece, whereby chattering vibration tends to occur. Particularly in milling a difficult-to-machine material, such as stainless steel or a heat-resistant steel, the required cutting force is great, and the resulting chattering vibration gives rise to chipping or adhesive wear of the cutting edge. As a consequence, a good finished surface could not be obtained heretofore with a cutter of this type. Furthermore, it is difficult and expensive to grind with high precision each cutting edge of a cutting tip parallel to the mounting face of the cutter body. In the case where chamfered parts are provided at opposite ends of a cutting edge, the linear cutting edge becomes short, and the feed quantity is limited, whereby the machining efficiency drops.

Furthermore, a cutting tip having a curved cutting edge is shown in FIG. 7 of the above mentioned patent publication. However, since the thickness of the cutting tip in the direction of the impact of intermittent cutting and of the principal component of the resistance to cutting is small, there arises a serious problem in that the cutting edge is readily chipped during cutting, whereby this cutting tip is unsuitable for cutting steel materials and difficult-to-machine materials of high cutting resistance. Furthermore, since a stepped projection exists on the rake face of this cutting tip, the outward flow of removed chips is obstructed.

In still another example of a known face milling cutter, as disclosed in the specification of U.S. Pat. No. 3,670,380, a circular cutting bit or tip is fixed to the front working face of a cutter body. This cutting bit has a frustoconical shape, and its cutting edge is of circular shape projecting in the cutting direction. In order to increase the cutting depth, the bit is inclined by an angle $\gamma$ in the feed direction. Therefore, the point of maximum cutting depth of the bit is shifted in the direction of the cutter center and the cutting edge of that part is at a positive radial rake angle. The removed chips are sent inward and impair the finished surface. In the above cited specification, moreover, there is no disclosure of finishing cutting by an inclined cutting edge.

In still another U.S. Pat. No. 4,175,896, a ball end mill is disclosed. The cutting edge of this end mill is a convex cutting edge. However, the cutting edge of this end mill does not constitute a cutting edge which is inclined relative to the cutting direction and is incapable of planar cutting.

SUMMARY OF THE INVENTION

Accordingly, it is a general object of this invention to provide a face milling cutter in which the above described problems accompanying the prior art have been solved. More specifically, the invention seeks to provide a face milling cutter in which: the cutting performance of the cutting edges of the cutting tips is good; the removed chips are discharged smoothly and positively; generation of chattering vibration is reduced; the mounting and detachment of the cutting tips can be carried in a simple and rapid manner; and, even when the workpiece is a difficult-to-machine material, a good finish surface can be obtained even under high-performance machining conditions.

According to this invention, briefly summarized, there is provided a face milling cutter comprising a cutter body and cutting bits or tips mounted thereon and characterized in that each cutting tip: (1) is of substantially flat shape with at least one cutting edge of convexly curved contour and has at one part of its peripheral surface a rake surface; (2) is so tangentially mounted that a front clearance face thereof leaves an axial relief angle relative to the surface of a workpiece being machined; and (3) is so mounted that the radial rake angle of the curved cutting edge is of a large negative value.

Because of the large negative value of the radial rake angle according to this invention as stated above, the actual rake angle of each cutting edge during milling, that is, the effective rake angle, becomes large, whereby the cutting quality and performance of the cutting edge is improved. Furthermore, because of the convexly curved contour of each cutting edge, the cutting edge is caused to engage gradually with the workpiece, whereby the cutting force also increases gradually, and the impact acting on the cutting edge is reduced. Another advantageous feature of this cutter is that, since each cutting tip is mounted tangentially relative to the cutter body, a long dimension of the tip is set in the direction in which the resistance to cutting acts, whereby chipping or breakage of the cutting edge does not easily occur. Still another advantage arising from the large negative value of the radial rake angle is that the resulting chips are discharged forcefully toward the outer side of the cutter body, whereby a very good finish surface without galling or other damage due to chips can be obtained.

The nature, utility, and further features of this invention will be more clearly apparent from the following detailed description when read in conjunction with the accompanying drawings, briefly described below.

BRIEF DESCRIPTION OF THE DRAWINGS

In the accompanying drawings:

FIG. 8 is a perspective diagram indicating the orientation of a mounted triangular cutting tip relative to a workpiece;

FIG. 9 is a perspective diagram, similar to FIG. 8, of a circular cutting tip;

FIG. 10 is a plan diagram indicating a state of cutting of a cutting tip of a milling cutter according to this invention relative to a workpiece;

FIG. 12 is a table including graphs indicating cutting conditions and finish surface roughness;

DETAILED DESCRIPTION OF THE INVENTION

Figure 1:
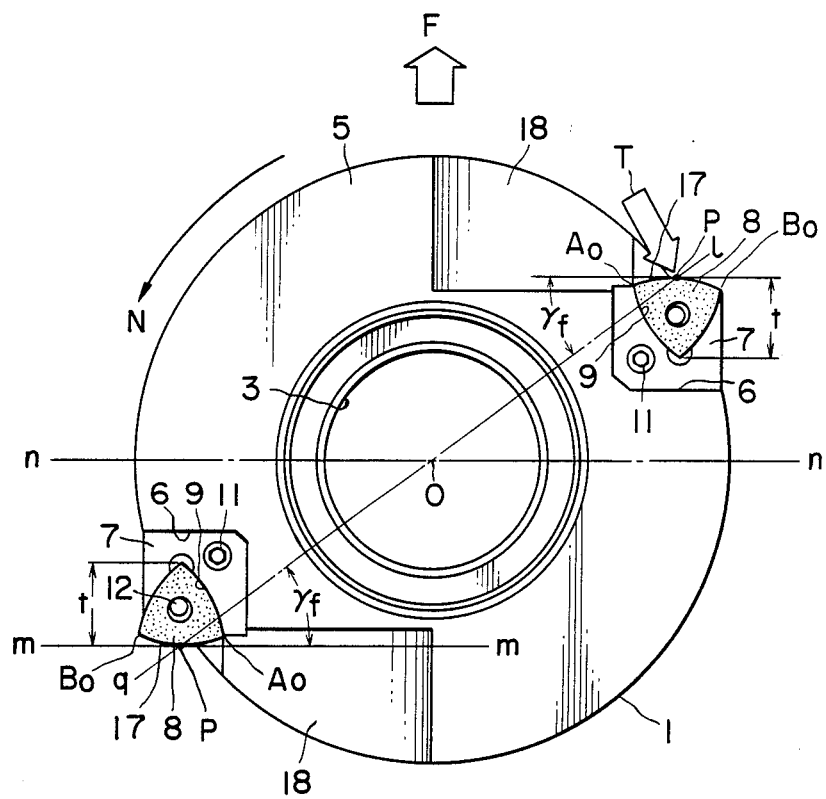
FIG. 1 is a front view of one example of the face milling cutter according to this invention as view in the axial direction of the cutter body.
Figure 2:
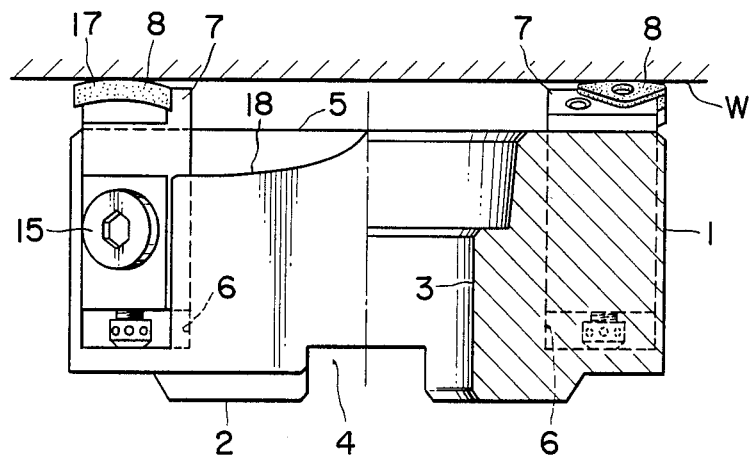
FIG. 2 is a side view orthogonal to FIG. 1, with a portion in section, of the same face milling cutter.

In one example of the face milling cutter according to this invention as illustrated in FIGS. 1 and 2, the basic structure of the cutter is a cutter holder or body 1. This cutter body 1 has a mounting surface 2 and a mounting bore 3 at its center for mounting on the arbor of the spindle side of a milling machine. The mounting surface has a key slot 4 formed therein for fitting engagement with a key on the spindle side (not shown), whereby rotational torque is transmitted from the spindle to the cutter body 1.

The cutter body 1 is provided on its peripheral part with two mounting slots 6 disposed at positions of point symmetry with respect to the center O of the cutter body 1 and extending parallelly to the rotational axis of the body 1 between the working end face 5 on the opposite side from the mounting surface 2 and positions near the mounting surface 2. In each of these mounting slots 6, a bit or cutting tip 8 is mounted by way of a cartridge 7.

Figure 3:
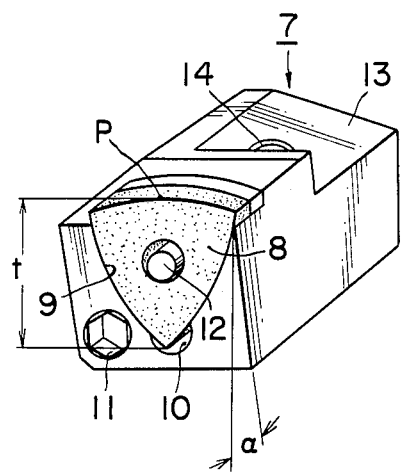
FIG. 3 is perspective view of a cartridge holding a triangular cutting tip mounted thereon.
Figure 4:
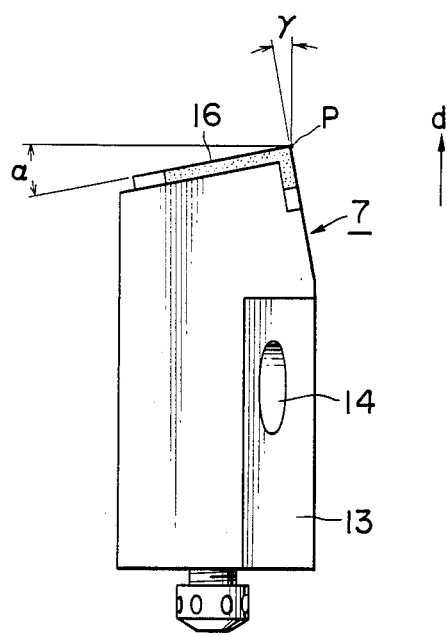
FIG. 4 is a side view of the same cartridge.

Each cartridge 7 has at a portion of its front or working end face, as shown in FIGS. 3 and 4, a pocket groove 9 of V-shaped cross sectional shape for receiving and holding the tip 8 in a specific position. The pocket groove 9 is provided at its bottom with a contiguous clearance cavity 10. The tip 8 has a central through hole 8h and is secured to its cartridge 7 by conventional means known in the tool industry. More specifically, when a clamp bolt 11 is turned, a clamp pin 12, which fits in the through hole 8h when the tip 8 is placed in the pocket groove 9, moves toward the convergent bottom of the V-shaped pocket groove 9, thereby fixedly holding the tip 8 against the cartridge 7.

Furthermore, the cartridge 7 is provided at a portion of its shank with an inclined mounting surface 13, at a central part of which a through hole 14 is formed. By screwing a mounting bolt 15 through this through hole 14 and a corresponding tapped hole (not shown) in the cutter body 1 and tightening the bolt 15, the cartridge 7 is fixedly held against the body 1.

Figure 5A:
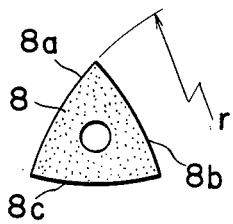
FIGS. 5(a) and 5(b) are respectively a plan view and a side view of a substantially triangular cutting tip.
Figure 5B:
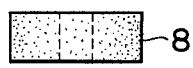
Figure 6A:
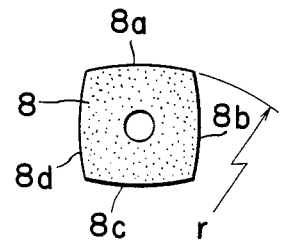
FIGS. 6(a) and 6(b) are respectively a plan view and a side view of a substantially square cutting tip.
Figure 6B:
Figure 7A:
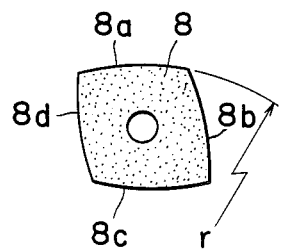
FIGS. 7(a) and 7(b) are respectively a plan view and a side view of a substantially equilateral parallelepipedal cutting tips.
Figure 7B:

As shown in FIGS. 5(a) and 5(b), the tip 8 is a disposable tip of a substantially triangular shape, in plan view or confrontal view as viewed from the workpiece, with convex arcuate sides 8a, 8b, and 8c of large radius of curvature constituting curved cutting edges. While, in the instant example, triangular tips are used, this invention is not thus limited, it being possible to use rectangular tips as shown in FIGS. 6(a) and 6(b) or parallelepipedal tips as shown in FIGS. 7(a) and 7(b). Examples of materials suitable for the tips are ultra-hard (sintered carbide) cermet, ceramics polycrystalline sintered alloys, and diamond. Furthermore, the tip may be of the negative type or positive type.

With the tip 8 in its state of being mounted via the cartridge 7 on the cutter body 1, the cutting edge 8a has a negative radial rake angle $\gamma_f$ as will be apparent from FIG. 1, and at the same time, as is apparent from FIG. 4, the front clearance surface 16 of the tip 8 has an axial relief angle $\alpha$. That is, the intersection angle $\gamma_f$ between the tangent line m—m passing through the midpoint P of the curved cutting edge 8a of the tip 8 and the line O-q connecting the point P and the center O of the cutter holder 1 is set within the range of from $-15$ degrees to $-60$ degrees and is set at $-30$ degrees in the illustrated example.

The cutting edge 8a has an upper rake surface 17 which is formed as a curved surface. A chip discharge recess or chip pocket 18 of ample width and depth is formed in the cutter body 1 to receive and discharge chips from each rake surface 17.

Since the tip 8 is mounted with an axial relief angle $\alpha$ on the cutter body 1, the midpoint P of the curved cutting edge 8a cuts the deepest into the workpiece W as shown in FIG. 2. Furthermore, the tip 8 is so mounted that it is thick in the direction of the principal cutting resistance or force T acting thereon (tangential mount).

Since the tip 8 is mounted in inclined state with a relief angle $\alpha$ relative to the workpiece surface, it is so mounted relative to the cutter body 1 that the radial rake angle $\gamma_f$ becomes negative. For this reason, as indicated in FIG. 8, the curved cutting edge 8a is a curve constituting a portion of an ellipse E which is inclined, in a direction such that its outer side is near the workpiece surface, at a certain inclination angle relative to the surface being machined of the workpiece W. In this connection, the shape of the rake surface is such that it becomes a curved surface sloping toward the outer peripheral side, and is inclined in a direction such that the outer peripheral side becomes nearer to the machining surface. The cutting of the workpiece is performed by the curved cutting edge 8a between the corners Ao and Bo of the cutting edge as shown in FIG. 8, the maximum cutting depth at this time being indicated by $d_{max}$.

The state of cutting of a circular tip is indicated in FIG. 9. This circular tip 8 is so mounted with an inclination relative to a horizontal plane that it has an axial relief angle $\alpha$ and that the radial rake angle $\gamma_f$ becomes a large negative angle. Here, A and B designate the opposite ends of the cutting edge acting on the workpiece at the time of maximum depth of cut.

The functional effect arising from the setting of the radial rake angle at a large negative value will now be described.

FIG. 10 is a partial plan view from above for a description of the state of machining of a rectangular workpiece W with a milling cutter according to this invention. The milling cutter rotates in the arrow direction N and advances in the feed direction F. Each of four tips 8A, 8B, 8C, and 8D mounted on the lower surface of the milling cutter is of planar form having a substantially triangular shape with convex arcuate sides functioning as curved cutting edges. Each cutting edge has a radial rake angle $\gamma_f$ of large negative value. For convenience in description, the cutting edge 8a of each is shown by solid line, while the cutting edges 8b and 8c not cutting are shown by intermittent line.

The milling process of each tip 8 is a repetition of periodic cycles, each cycle comprising four successive steps or states of the cutting edge of engagement or biting into the workpiece surface, cutting away a layer of the workpiece by shearing, separating from the workpiece, and idling motion, which are respectively represented by the four tips 8 with subscripts A, B, C, and D in FIG. 10.

If it were not for the advantageous provision of a radial rake angle of large negative value according to this invention as described below, an extremely great cutting resistance or force would act on a tip at the time of engagement or biting in, and the cutting resistance would drop abruptly to zero at the time of separation. In general, chipping or breakage of a tip cutting edge occurs most readily when the tip is in these two states.

By setting the radial rake angle $\gamma_f$ of each tip 8 at a large negative value, according to this invention, the cutting edge of the tip gradually begins from its righthand end to bite into and cut the workpiece W as shown by the tip 8A in FIG. 10. For this reason, the cutting resistance also increases gradually, and the impact acting on the cutting edge is reduced. As a result, the possibility of breakage of the tip cutting edges is greatly reduced. Furthermore, the noise caused by the machining process is reduced.

Another benefit obtained by using a radial rake angle $\gamma_f$ of large negative value is that the essential rake angle, that is, the effective rake angle, of the cutting edge during cutting is increased, and the cutting quality of performance is improved. This feature can also be demonstrated quantitatively from the following equations. The following relationship is valid in terms of the effective rake angle $\gamma_e$, the chip flow angle $\eta_c$, the radial rake angle $\gamma_f$, and the normal (perpendicular) rake angle $\gamma_n$.

$$\sin \gamma_e = \sin \eta_c \cdot \sin \gamma_f + \cos \eta_c \cdot \cos \gamma_f \sin \gamma_n \quad (1)$$

From Stabler's law established through experiment, $\gamma_f \approx \eta_c$ in the ordinary case. Therefore $$\sin \gamma_e = \sin^2 \gamma_f + \cos^2 \gamma_f \sin \gamma_n \quad (2)$$

Then, for the condition of $\gamma_f = -30°$ and $\gamma_n = -5°$, $\gamma_e$ becomes 10.64 degrees, and even if the normal rake angle $\gamma_n$ is a negative angle, the actual machining will be carried out with good cutting action with a positive rake angle. In the case where $\gamma_f = 0°$, $\gamma_e = \gamma_n = -5°$ as a natural consequence, and the cutting performance is poor.

At the outer end B of the cutting zone as shown in FIG. 8, the radial rake angle $\gamma_{fB}$ becomes as large as $-70°$ or more. For the condition of $\gamma_{fB} = -70°$ and $\gamma_n = -5°$, the effective rake angle $\gamma_e$ becomes as large as 60.8°, which indicates that, at the outer end of the cutting zone, the cutting edge acquires an extremely good cutting quality.

Still another benefit accruing from the setting of the radial rake angle at a large negative value is that the removed material or chips produced by the cutting action are ejected forcefully and positively outward from the milling area. As a result, the chips are prevented from being temporarily entrapped between the cutter body 1 and the workpiece and damaging the finished surface of the workpiece.

Next, the strength of the tips which is of the utmost importance in milling operation will be considered. High tip strength is an indispensable property in milling, in which repeated impact due to intermittent cutting acts on each tip, and depends on the tip material and the tip thickness in the direction in which it is subjected to the impact. According to this invention, the tips are so mounted on the cutter body 1 that the dimension of each tip in the direction of the principal resistance during cutting operation will be large, whereby ample tip strength is assured.

The functional effect afforded by the use of tips of curved rake surfaces and curved cutting edges will now be described. In the milling cutter of this invention, the rake surface of each tip 8 assumes the shape of a convex curved surface as viewed in the cutting direction of the tip. For this reason, even in the case where just at the instant of biting or engagement into the workpiece W, the tangent m of the midpoint P of the cutting edge and the end line of the workpiece coincide, the cutting edge bites into the workpiece gradually from its midpoint P, which is the most outwardly protruding part. For this reason the resistance to cutting does not abruptly rise to a maximum but increases gradually, whereby the impact at the time of biting in or engagement is also lessened, and chipping or breakage of the cutting edge is also reduced.

Furthermore, since the rake surface of each tip is a curved surface, the tip strength is higher than that of a conventional tip of planar rake surface. The reasons for this are that impact loads are dispersed in the case of a curved surface and that, since the force receiving surface area is greater than that of a planar surface, the impact load per unit area is reduced. As a result, periodic chattering vibrations due to impact caused by the biting in and separation of each tip are suppressed.

Figure 11:
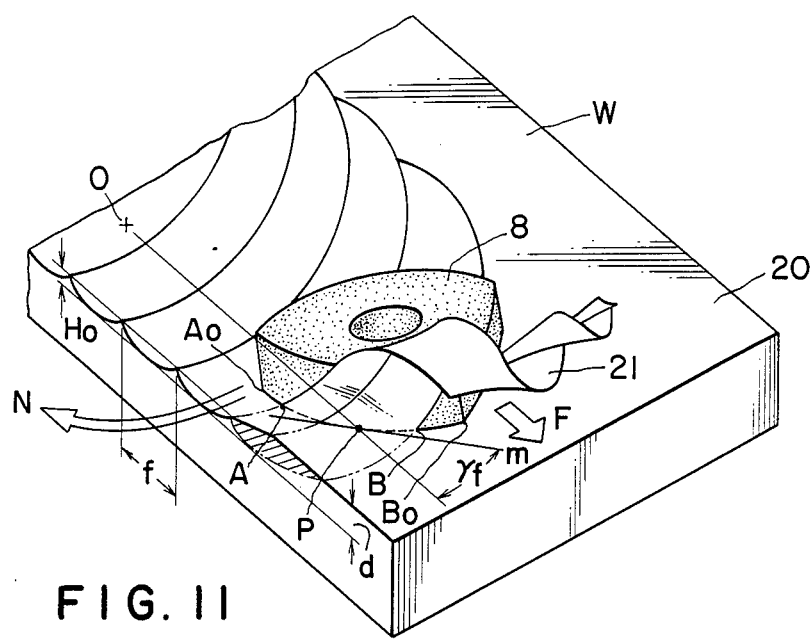
FIG. 11 is a perspective diagram indicating the state of cutting by a cutting tip of the invention.

Furthermore, a curved rake surface gives rise to less melt adhesion of removed material than a planar rake surface, and this, together with the aforedescribed high strength of the cutting edges, prolongs the serviceable life of the tip. The reason for this is that the effects of the curved rake surface and of the large negative value of the radial rake angle $\gamma_f$ are combined, whereby as shown in FIG. 11 the chip or cut material is discharged as it curls smoothly in spiral form over the rake surface from the inner part of the cutter body toward its outer periphery.

Furthermore, in the case of a planar rake surface, since the shearing cycle of the material being removed is constant, chattering readily occurs. In contrast, with a curved cutting edge and a curved rake surface according to this invention, the thickness of the chip is not uniform, whereby the shearing period is not constant, and chattering does not readily occur.

Theoretically, the roughness of the finished surface of a workpiece is determined by the nose radius of the cutting edge of the tool and the feed thereof. According to this invention, each of the tip used is a flat tip which has around its periphery a number of outwardly bulging convex cutting edges each of arcuate shape of large radius of curvature, and which is so constructed that its flat surface will become substantially parallel to the surface being machined of the workpiece, giving only the relief angle of the cutting edge. For this reason, as indicated in FIG. 8, the cutting edge is formed as a curved line of a portion of an extremely large ellipse E. Therefore, a very good finished surface roughness can be obtained even with a high rate of feed.

A further advantageous feature of the instant tips, and therefore of the face milling cutter of this invention, is that, since the cutting edges are not linear, there is no need to produce strict parallelism with the mounting reference surface of the cutter body 1 or to selectively use a milling machine of high precision which has no askewness or no run-out of the main spindle.

negative value, whereby the cutting quality of the outer end of the cutting edge performing minute cutting of the workpiece surface is especially improved. Furthermore, since each tip is secured to the cutter holder by a simple construction comprising a pin or bolt passed through a central hole in the tip, the tip strength is high, whereby there is little change of chipping and breakage, and the cutting quality is good, whereby chattering vibration does not easily occur. Further advantageous features are good discharging action of removed chips, facility of fabricating the tips and cutter body at low cost, and ease in handling the facing milling cutter. As a result, an excellent finished surface can be obtained under good or high machining conditions.

A conventional face milling cutter for finishing work of high performance and a face milling cutter of this invention were used to machine workpieces of the same material, and the results were compared as in Table 1. These results indicate that the face milling cutter of this invention is superior in machining efficiency by 2.9 times, in tool life by 2 times, and in finish surface smoothness.

TABLE 1

| Comparison of milling cutter of this invention and conventional milling cutter | | |
|---|---|---|
| | Conventional Milling Cutter | Milling Cutter of This Invention |
| Workpiece material | Ni Cr Steels (JIS:SCN2) | Ni Cr Steels (JIS:SCN2) |
| Cutter diam. | 160 mm | 160 mm |
| no. of tips (bits) | 1 | 1 |
| Tip material | TiC cermet | TiC cermet |
| (bit) shape | linear cutting edge, flat rake surface | curved cutting edge, curved rake surface |
| Milling machine | "Planomiller" (main motor output: 19 KW) | (Same as at left) |
| Machining conditions: | | |
| cutting velocity, V | 125.6 m/min. | 243 m/min. |
| feed, F | 1,245 m/min | 3,600 m/min. |
| cut depth, d | 0.05 mm | 0.05 mm |
| cutting fluid | (dry) | (dry) |
| Machining efficiency (comparison of feeds) | 1 | 2.9 times |
| Finished surface roughness $R_{max}(\mu m)$ | 6.2 | 5.1 |
| Tool life: no. of workpieces (square bars) | 4 | 8 (2 times) |

The various meritorious effects and features of this invention described above are exhibited in a synergistic form in actual machining. As indicated in FIG. 11, which schematically shows the state of cutting of a cutting edge part of a face milling cutter of this invention, the tip 8 is thick in the direction of action of the principal cutting resistance and, with its cutting edge part at the outer end B of the cutting zone of good cutting quality, is cutting the surface 20 of the workpiece W, and the resulting continuous chip 21 is being discharged outward as it is caused to curl spirally by the radial rake angle of large negative value and the smooth curved rake surface.

As described above, this invention uses a flat tip having around its periphery a number of outwardly bulging convex cutting edges each of arcuate shape of large radius of curvature. This tip is so adapted that its front clearance surface will become substantially parallel to the surface being machined of the workpiece, giving only the small relief angle of the cutting edge, that its thickness will become a maximum in the direction of the principal component of the cutting resistance, and that, moreover, the rake surface will become a smooth curved surface without any projections, this curved surface as a whole forming a radial rake angle of large FIG. 12 is a table showing graphs of finish surface roughness and machining conditions under which these graphs were obtained by using a milling cutter of this invention in which only one tip was mounted on the cutter body. While the upper graph [Example (a)] corresponds to somewhat low-performance machining conditions, it indicates an example of finishing only by milling with the use of a milling cutter of this invention a workpiece which heretofore was required to meet a severe finish surface roughness standard by hand polishing after finishing by milling. A maximum roughness $R_{max}$ of the finish surface of 1 $\mu m$ was attained, and the flatness (absence of waviness) of the machined surface was also excellent. This degree of precision could not be attained by milling cutters for finishing in the prior art. Example (b) illustrates a case where a workpiece of babbitt metal was machined at the highest feed rate (10 m/min), of a machining center and a maximum roughness of finished surface of 2 $\mu m$ was obtained.

Figure 13:
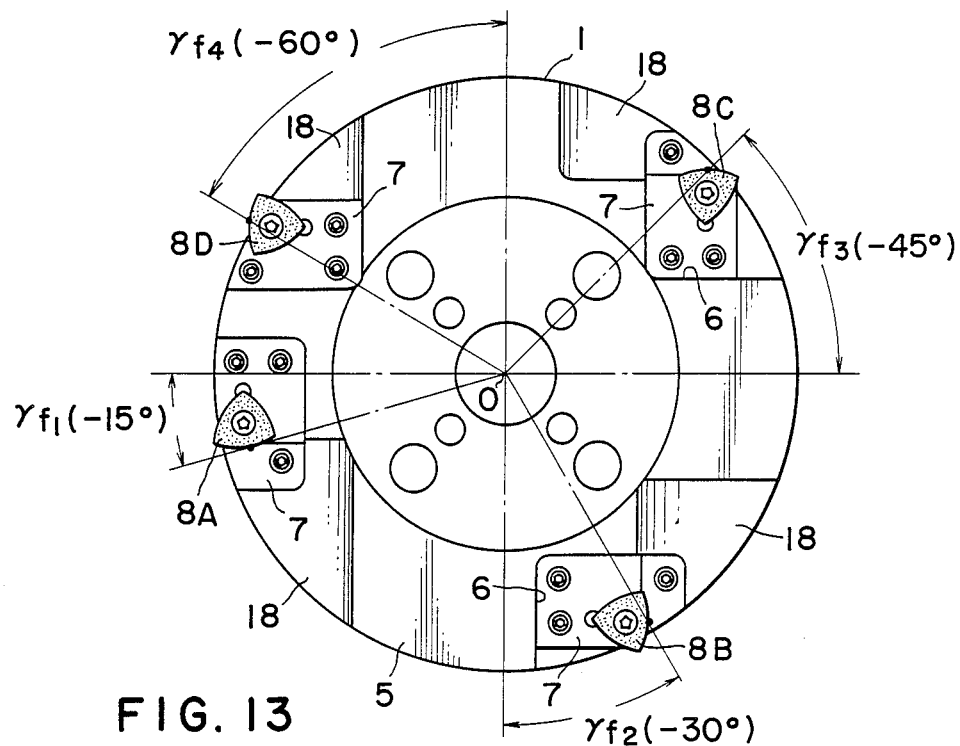
FIG. 13 is a frontal view, similar to FIG. 1, showing a milling cutter provided with four cutting tips set at respectively different radial rake angles.

In the aforedescribed example of the milling cutter of this invention, the radial rake angles of the plurality of tips 8 mounted on a single cutter body 1 are set at equal values. According to another embodiment of this invention, however, these angles can also be set at respectively different values as illustrated by one example in FIG. 13. More specifically, FIG. 13 illustrates another embodiment of the invention wherein four cartridges 7 are so installed that the radial rake angles $\gamma_f$ respectively of four tips mounted on one and the same cutter body 1 are respectively set at different negative values. That is, these angles are set at values of $\gamma_f$ of $-15$ degrees to $-60$ degrees, being varied successively by $-15$ degrees.

In general, the greater the absolute negative value of the radial rake angle $\gamma_f$ is, the lower is the machining resistance and the less likely is chatter to occur. However, since the radius of curvature of the cutting edge forming the finish surface becomes small, the resulting finish surface roughness increases, that is, the surface texture becomes poor. Accordingly, by placing the cartridges 7 and the tips 8 as shown in FIG. 13, it becomes possible to select the values of $\gamma_f$ in accordance with the tendency of the workpiece to incur chattering, whereby the range of applicability can be broadened. For example, in the case of a workpiece which very easily incurs chattering, machining can be carried out by mounting the tip 8D on its cartridge 7 set at an angle $\gamma_{f4}$ of $-60$ degrees. In this case, the tips are dismounted beforehand from the other locaters, and only one tip (8D) of only one position is used.

A further modification comprises using cartridges of cylindrical shape, mounting tips on their end parts, fitting the cartridges into the aforedescribed cartridge mounting slots provided in the cutter body, selecting the radial rake angles $\gamma_f$ according to the chattering tendency of the workpiece, and then fixing the cartridges by means of bolts or the like.

Figure 14:
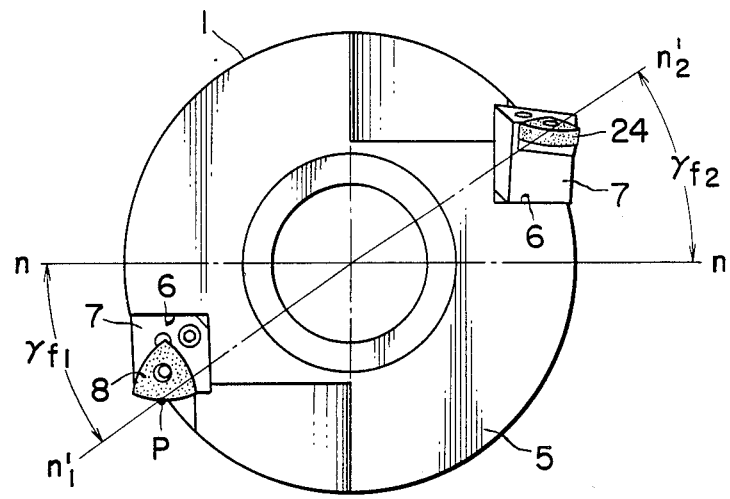
FIG. 14 is a frontal view of a face milling cutter constituting another embodiment of the invention.
Figure 15:
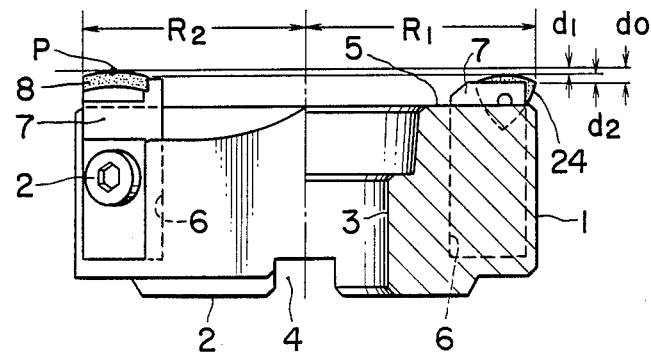
FIG. 15 is a side view orthogonal to FIG. 14, with a portion in section, of the same milling cutter.

In another embodiment of this invention as illustrated in FIGS. 14 and 15, a semi finishing tip 24 and a finishing tip 8 are mounted at diametrically opposite positions on a common cutter body. The semi finishing tip 24 is a triangular flat tip mounted with an upright orientation, presenting a radial rake angle $\gamma_{f2}$ of negative value relative to the workpiece. Its rake face is planar, and its cutting edge is an outwardly convex curved line. Its axial rake angle may be either positive or negative. The finishing tip 8, on the other hand, is mounted similarly as in the preceding example. Furthermore, the mounting radius $R_1$ of the semi finishing tip 24 is greater than the mounting radius $R_2$ of the finishing tip 8, that is, $R_1 > R_2$, and the outermost extremity of the cutting edge of the finishing tip 8 projects by a distance $d_1$ further outward than that of the semi finishing tip 24.

When a milling machine provided with a milling cutter of the above described arrangement is operated in rotation and feed movement, the semi finishing tip 24 first engages the workpiece W and begins cutting with a cutting depth $d_2$. Then the finishing tip 8 carries out finishing at a cutting depth which is deeper by $d_1$. The total cutting depth $d_0$ is the sum of $d_1$ and $d_2$, that is, $d_0 = d_1 + d_2$. In this example, tips of exactly the same shape, dimensions, and material can be used for both finishing and roughing. For this reason, production, control, and operation are facilitated and made economical. In addition, since a depth of cut which is of the order of five times that in the case of only the finishing tip 8 can be obtained, the machining efficiency is extremely high in the case of finishing of a workpiece from which a great amount of material is to be removed.

Figure 16:
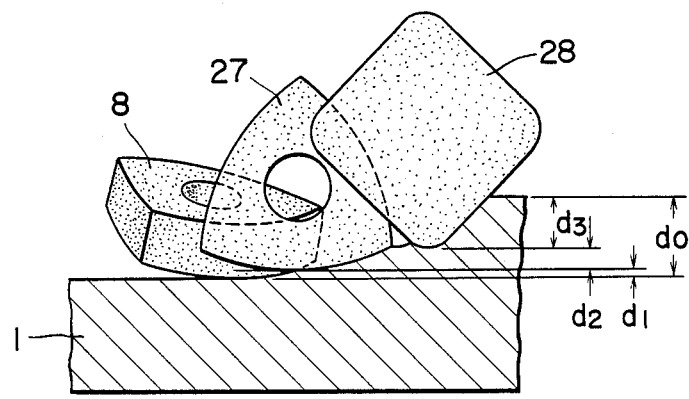
FIG. 16 is side diagram indicating the manner in which three cutting tips are used in combination to accomplish, respectively, roughing, semifinishing, and finishing.

In still another example of practice of this invention as indicated in FIG. 16, a square roughing tip 28, a triangular semifinishing tip 27, and a triangular finishing tip 8 are mounted on the same cutter body 1 and thus used in succession for cutting depths of $d_3$, $d_2$, and $d_1$, respectively. The total cutting depth $d_0$ is the sum of the depths $d_3$, $d_2$, and $d_1$. The positions of these tips as measured in the radial direction from the rotational axis of the milling cutter are such that the roughing tip 28 is the furthest out from the axis, and the finishing tip 8 is the innermost, the semifinishing tip 27 being in an intermediate position. In this case, it is preferable to use a plurality of roughing tips 28 so as to suitably reduce the quantity of material cut by each cutting edge.

While this invention has been described above with respect to examples of cutting tips of substantially triangular, rectangular, parallelogrammatic, and circular contour shapes, it is to be understood that cutting tips of other contour shapes such as elliptical and any other closed figure, or combinations of such shapes are all within the intended purview of this invention.

What is claimed is:

1. A face milling cutting tool, comprising a cutter body with cutting tips mounted thereon, each cutting tip being of substantially flat shape with at least one cutting edge of convexly curved shape and having at one part of its peripheral surface a rake surface, each cutting tip being so tangentially mounted that a front clearance face thereof is positioned at an axial relief angle relative to the surface of a workpiece being machined and each cutting tip being so mounted that the radial rake angle formed by the tangent line passing through the midpoint of the curved cutting edge of the tip and the line connecting the midpoint and the center of the cutter body has a value between $-15$ degrees to $-60$ degrees.

2. A face milling cutting tool according to claim 1 in which each cutting tip is mounted on a cartridge, which in turn is mounted on the cutter body.

3. A face milling cutting tool according to claim 1 in which each cutting tip is so mounted on the cutter body that the radial rake angle thereof can be varied within a specific range of negative values.

4. A face milling cutting tool according to claim 1 in which at least one of said cutting tips is of substantially triangular shape as viewed in the plane of said flat shape.

5. A face milling cutting tool according to claim 1 in which at least one of said cutting tips is of substantially rectangular shape as viewed in the plane of said flat shape.

6. A face milling cutting tool according to claim 1 in which at least one of said cutting tips is of a closed-figure shape of a smoothly continuous periphery as viewed in the plane of said flat shape.

7. A face milling cutting tool according to claim 1 in which said cutting tips are detachably mounted on the cutter body at such respective positions that the respective radial rake angles thereof will assume mutually different negative values.

8. A face milling cutting tool according to claim 1 and further comprising a semi finishing tip which is so disposed that the cutting edge thereof is radially further from the cutter body axis than that of said cutting tip, and which is mounted with an upright orientation relative to said surface of the workpiece.

* * * * *